United States Patent [19]

Martin et al.

[11] Patent Number: 4,818,792

[45] Date of Patent: Apr. 4, 1989

[54] STABILIZED HIGH SOLIDS LOW TG COPOLYMER NONAQUEOUS DISPERSION FOR CLEAR COAT FINISHES

[75] Inventors: Glenn E. Martin, Farmington Hills; Timothy D. Salatin, Bloomfield Hills; Vincent C. Cook, Madison Heights, all of Mich.

[73] Assignee: BASF Corporation, Clifton, N.J.

[21] Appl. No.: 51,254

[22] Filed: Apr. 14, 1987

Related U.S. Application Data

[63] Continuation of Ser. No. 728,644, Apr. 29, 1985, abandoned.

[51] Int. Cl.[4] .................. C08F 267/02; C08F 267/06; C08L 51/06
[52] U.S. Cl. .................................... 525/286; 525/910; 525/911; 525/912; 525/913; 525/925; 524/531
[58] Field of Search .................. 525/286, 910–913, 525/925; 524/531

[56] References Cited

U.S. PATENT DOCUMENTS

| | | | |
|---|---|---|---|
| 3,637,569 | 1/1972 | Fang . | |
| 3,660,537 | 5/1972 | Fryd et al. . | |
| 3,689,593 | 9/1972 | Jackson | 260/859 |
| 3,857,905 | 12/1974 | Blackley et al. | 525/913 |
| 4,181,783 | 1/1980 | Chattha | 525/913 |

FOREIGN PATENT DOCUMENTS

| | | |
|---|---|---|
| 2142598 | 3/1972 | Fed. Rep. of Germany . |
| 893429 | 4/1963 | United Kingdom . |
| 934038 | 8/1963 | United Kingdom . |
| 1095931 | 12/1967 | United Kingdom . |
| 1096912 | 12/1967 | United Kingdom . |
| 1353634 | 3/1974 | United Kingdom . |

OTHER PUBLICATIONS

Nielsen, "Mechanical Properties of Polymers", p. 23, 1962.
Dispersion Polymerization in Organic Media–Chapter 3 (1975).
Dispersion Polymerization in Organic Media–Chapter 5.
J. Polymer Science, Part C, No. 30 381 (1970).
J. Oil Color Chemical Association, 1971, Nature 176, 78 (1955).

*Primary Examiner*—Carman J. Seccuro
*Attorney, Agent, or Firm*—Emil R. Skula; A. Dean Olson

[57] ABSTRACT

A high solids, stable, nonaqueous dispersion, comprising a low Tg copolymer, having a Tg between about $-10°$ C. and about 30° C., particularly adapted for use as a clear coat automotive finish. The copolymer is the copolymerization product of monomers whose Tg is above about 50° C., polar monomers whose Tg is up to about 15° C. and $\alpha, \beta$ ethylenically unsaturated stabilizer copolymers. The stabilizer copolymers are formed from $\alpha, \beta$ ethylenically unsaturated monomers and at least one oxirane containing compound and have a molecular weight of about 2,000 to about 25,000, are soluble in aliphatic solvents and have a Tg of about $-60°$ C. to about 0° C. These nonaqueous dispersions result in coatings having high % solids, ease of application, minimal sagging and good gloss and DOI. They are preferably made by copolymerizing ethylenically unsaturated monomers with about 0.5% to about 4% acid functional chain transfer agents and reacting the thus formed copolymer with about 1% to about 4% oxirane containing $\alpha, \beta$ ethylenically unsaturated monomers to modify the copolymer resulting in a stabilizer copolymer. The nonaqueous dispersion is made by a free radical copolymerization of the monomers whose Tg is above about 50° C., polar monomers whose Tg is up to about 15° C., and the stabilizer copolymers in a nonpolar solvent at reflux temperatures.

18 Claims, No Drawings

STABILIZED HIGH SOLIDS LOW IG COPOLYMER NONAQUEOUS DISPERSION FOR CLEAR COAT FINISHES

This application is a continuation of application Ser. No. 782,644 filed Apr. 29, 1985, now abandoned.

CROSS REFERENCE TO RELATED APPLICATIONS

Attention is directed to commonly assigned copending applications, entitled "Stabilizer for Nonaqueous Dispersion Clear Coat Finishes", now Ser. No. 131,287, filed 12/10/87, entitled "High Solids Low Tg Copolymer Nonaqueous Dispersion for Clear Coat Finishes", now Ser. No. 118,087, filed on 11/6/87, the disclosures of which are incorporated by reference.

1. Technical Field

This invention relates to stabilized nonaqueous dispersions particularly adapted for use as clear coat automative finishes.

2. Background Art

With the advent of enviromental concerns and industries' emphasis on reducing costs, coatings have been the aim of significant research efforts. For instance, to reduce pollution the solvent content of nonaqueous coatings should be kept low in order that an acceptable level of organic solvents are vented to the atmosphere. In addition, since the coating solvents evaporate during application and curing, a high solids coating will reduce the need for costly solvents. However, a high solids coating is not the only desirable coating property.

The viscosity of the coating is an important property because during application, i.e. spraying, a low viscosity is desired, however, after application and evaporation of the solvents, a high viscosity coating is typically necessary to eliminate sagging of the coating. In the clear coat automotive finishes industry, in addition to vis cosity and high solids, the quality of properties such as gloss and Distinctness of Image (DOI) is also important. However, the attainment of an acceptable balance of such properties is not always possible with many coating compositions.

For example, a high percent solids can be achieved using solution polymers by lowering the molecular weight of the polymer resulting in reduced viscosity. However, at a 50–60% solids level the low molecular weight copolymer, (having a low viscosity), results in significant sagging of the coating upon application and evaporation of the solvents. Since industry tyically requires a 2.5 mil coat without sagging, thixatropes are typically added to the low molecular weight, high solids, solution polymers to achieve the required coating thickness without sagging. However, thixatropes are an added expense and they can result in coatings having for example lower gloss.

In contrast, a high percent solids can be achieved with a nonaqueous dispersion without lowering the molecular weight of the polymer because the polymers are in the dispersed phase. Thus, nonaqueous dispersions break the viscosity dichotomy required of good coatings, i.e., a low viscosity during application and a high viscosity after application. During application of the nonaqueous dispersion, the viscosity is low because the polymer is in the dispersed phase and after application and solvent evaporation, there is a high viscosity since the molecular weight was not lowered. Even though nonaqueous dispersions solve the viscosity-percent solids problem, nonaqueous dispersions can result in ocatings having for example lower glass, DOI, and flow. In addition, nonaqueous dispersions typically rqeuire a stabilizer (a nonaqueous surfactant) to reduce coagulation of the dispersed phase polymerization.

Different stabilizers achieve greater or lesser success in achieving a uniform dispersion that does not coagulate. In addition, when stabilizers are present in the dispersion in greater than small quantities, they can effect the character of the properties of the final coating composition. thus, stabilizers can be a significant part of nonaqueous dispersion technology.

Accordingly, there is a continual search for stable high solids coating compositions that have such properties as low sagging.

DISCLOSURE OF INVENTION

This disclosure is directed to a stable, high solids nonaqueous dispersion that has good sag resistance. The nonaqueous dispersion comprises the copolymerization product of monomers whose glass transition temperature (Tg) is above about 50 degrss centigrade (°C.), polar monomers whose Tg is up to about 15° C., and $\alpha$, $\beta$ ethylenically unsaturated stabilizer copolymers formed from $\alpha$, $\beta$ ethylenically unsaturated monomers and at least one oxirane containing compound. The stabilizer copolymer has a molecular weight of about 2,000 to about 25,000, is soluble in aliphatic solvents, and has a Tg of about $-60°$ C. to about 0° C. The copolymerization product is a low Tg copolymer having a Tg between about $-10°$ C. and about 30° C.

Another aspect of this invention is a method of producing a stable high solids nonaqueous dispersion that has good sag resistance particularly adapted for use as a clear coat automative finish. $\alpha$, $\beta$ ethylenically unsaturated monomers are copolymerized with about 0.5% to about 4% acid functional chain transfer agent to form a copolymer and reacting that copolymer with about 1% to about 4% oxirane containing ethylenically unsaturated monomers to modify the copolymer. The modified copolymer is copolymerized with monomers whose Tg is above abot 50° C. and polar monomers whose Tg is up to about 15° C. to form a second copolymer such that the second copolymer is a low Tg coplymer having a Tg between about $-10°$ C. and about 30° C.

This invention provides stable, high solids, low sag, nonaqueous dispersions that are particularly useful in coating compositions. Thus the invention is a significant advance in the field of clear coat finishes.

BEST MODE FOR CARRYING OUT THE INVENTION

Any low Tg polar (polar refers to insolubility in typical alkane solvents) copolymer resulting in a coating composition that has the requisite properties described in the background art such as high percent solids and low sag may be used as the backbone of the nonaqueous dispersion copolymer of this invention. Tg refers to the temperature that is related to the onset of segmental motion in the amorphous regions of the polymer. Typically, the low Tg polar copolymer is formed from monomers whose Tg is above about 50° C. and polar monomers whose Tg is up to about 15° C. such that the polar copolymer formed from these has a Tg between about $-10°$ C. and about 30° C. The Tg of monomers refers to the Tg of the homopolymer of that particular monomer. Although the Tg is also dependent on molecular weight, it typically reaches a maximum and that maximum Tg is the Tg referred to.

It is preferred that the monomers whose Tg is above about 50° C. comprise acrylic acid and esters thereof, methacrylic acid and esters thereof, styrene, vinyl toluene, α-methylstyrene or mixtures thereof. It is essentially preferred that these monomers comprise methyl methacrylate, styrene, acrylic acid or mixtures thereof and it is especially preferred that they are present in the nonaqueous dispersion in the following respective proportions: methyl methacrylate about 0 weight percent based on final coppolymer including any stabilizer (%) to about 45%, styrene about 0% to about 10%, acrylic acid about 0% to about 5%.

It is also preferred that the monomers whose Tg is up to about 15° C. comprise polar esters derived from acrylic acid. It is especially preferred that these monomers comprise ethyl acrylate, hydroxyl ethyl acrylate, or mixtures thereof and even more especially preferred that they are present in the nonaqueous dispersion in the following proportions: ethyl acrylate about 9% to about 60%, hydroxy ethyl acrylate about 10% to about 40%.

It is also preferred that the low Tg polar copolymer, formed from monomers whose Tg is above about 50° C. and polar monomers whose Tg is up to about 15° C., such that the polar copolymer formed has a Tg between about −10° C. and about 30° C., has a low cross-link density. Cross-link density of the copolymer refers to the cross-link density of the copolymer upon curing typically upon the addition of a conventional cross-linking agent such as a melamine formaldehyde derivative and heat. It is believed that higher levels of cross-linking adversely affect the resultant properties such as gloss, DOI and solvent resistance. Typically such properties as solvent resistance are weakened with lower levels of cross-linking so it is surprising that these lower levels provide improved properties. Thus, it is especially preferred that the polar monomer whose Tg is up to about 15° C. comprises about 10% to about 40% of a hydroxyl functional monomer. This is preferred as the hydroxyl functionality is directly proportional to the amount of cross-linking and at these levels of hydroxyl the desired amount of cross-linking is achieved. It is even more especially preferred that the hydroxyl functional monomer comprises about 10% to about 40% hydroxyl ethyl acrylate available from Rohm and Haas Co., Philadelphia, Pa.

Any polymerization initiator may be used in the practice of this invention that will provide the molecular weight such that the resultant stabilizer copolymer has the properties cited above. It is believed that the molecular weights are typically about 30,000 to about 100,000, however since these copolymers can contain gel, it is difficult to make an accurate determination of the molecular weight. It is especially preferred to use free radical pol merization initiators such as azo initiators or peroxides and especially preferred that AIBN ™ (2,2′-azobis(isobutyronitrile), VAZO ™ 67 (2,2′-Azobis-(2-methyl butyronitrile) (DuPont DeNemours Inc.) or t-amyl perbenzoate ™ (t-amyl peroxy-benzoate) (Lucidol Chemicals) initiators are used. In addition to the initiators it is preferred to use chain transfer agents such as mercaptan, time wise addition of reactants and other products and processes to aid in controlling the molecular weights so that the amount of dispersed phase gel is minimized. Excessive amounts of gel make it difficult to apply the coating and diminishes the quality of the coating appearance properties.

Typically, nonaqueous dispersions require a stabilizer or surfactant so that coagulation in the dispersed phase will not occur. Any stabilizer that provides a stable uniform nonaqueous dispersion and results in a coating composition that has the requisite properties described above may be used in the practice of this invention. Although a stabilizer that is simply added to the nonaqueous dispersion coating composition such as an aliphatic soluble melamine formaldehyde crosslinker may be used in the practice of this invention, it is preferred that a stabilizer that is reacted in, or copolymerized with the coating composition monomers such as the reaction product of poly 12-hydroxystearic acid and glycidyl methacrylate is used in the practice of this invention as these stabilizers result in a more uniform stable dispersion. It is especially preferred that the stabilizers, described in full below and in commonly assigned copending application entitled "Stabilizer for Nonaqueous Dispersion Clear Coat Finishes" Attorney Docket No. IN-1005, cited above, are used in the practice of this invention as they provide better dispersions.

Any α, β ethylenically unsaturated monomers may be used to form the stabilizer copolymer of this invention that upon copolymerization results in an aliphatic soluble copolymer. Preferably, the ethylenically unsaturated monomers comprise monomers whose homopolymers are aliphatic soluble and monomers whose homopolymers are aliphatic insoluble. The combination of differentially soluble monomers is preferred as the insoluble monomers aid in association with the dispersed phase of a nonaqueous dispersion by promoting a more efficient polymerization of the unsaturated part of the stabilizer whereas the insoluble monomers carry the unsaturated group of the stabilizer into the dispersed phase monomers of the nonaqueous dispersion. These solubility terms refer to solubility in conventional aliphatic solvents, such as hydrocarbons. Preferably, the monomers whose homopolymers are aliphatic soluble comprise acrylate, or methacrylate monomers or mixtures thereof. It is especially preferred that these monomers comprise ethyl hexyl acrylate, preferably by at least 50%. These preferred monomers impart better appearance properties to the coatings which are the preferred use of these stabilizers. Preferably the monomers whose homopolymers are aliphatic insoluble comprise acrylate or methacrylate monomers or mixtures thereof. It is especially preferred that the acrylate and methacrylate monomers comprise methyl methacrylate, preferably up to about 50%.

It is also preferred that about 5% to about 30% of the monomers comprise hydroxyl functional monomers because when stabilizers without hydroxyl functionality are used in the nonaqueous dispersions of this disclosure, they result in a coating comp sition which upon application can experience brittleness. This is surprising for these types of copolymers because they are low Tg copolymers. It is believed that when the stabilizer is reacted into a copolymer containing hydroxyl groups which is subsequently formulated, it is not compatible with the rest of the coating formulation, such as cross-linking agents, since the stabilizer does not contain hydroxyl groups. Thus in order to make the stabilizer containing nonaqueous dispersion copol mer more compatible with the coating formulation, a hydroxyl functional stabilizer is beneficial. Preferably the hydroxyl functional monomer comprises hydroxyl containing acrylate or hydroxyl containing methacrylate monomers or mixtures thereof. It is especially preferred that the hydroxyl functional monomer comprises hydroxyl ethyl methacrylate.

Any polymerization initiator may be used in the practice of this invention that will aid in attaining the molecular weights described below. It is especially preferred to use free radical polymerization initiators such as azo initiators, peroxides and especially preferred that AIBN TM 2,2'-azobis (isobutyronitrile), or VAZO TM 67, 2,2'-azobis(2-methylbutyronitrile) (DuPont DeNemours Inc.) initiators are used. It is also preferred that acid functional initiators such as 4—4' azobis (4-cyanovaleric acid) available from Aldrich Co. are used as some of the preferred methods of making these stabilizers that result in copolymers that are essentially monofunctional in α, β ethylenically unsaturation require acid functional initiators Any oxirane containing α, β ethylenically unsaturated monomer may be used in the practice of this invention which in conjunction with an acid provides unsaturation to the stabilizer copolymer. An oxirane group is one having the structure =COC=, which is one type of epoxy group. It is preferable that the oxirane containing α, β ethylenically unsaturated monomers comprises glycidyl methacrylate or glycidyl acrylate. It is especially preferred that it comprises glycidyl methacrylate available from Alcolac Chemicals.

Any acid containing α, β ethylenically unsaturated monomer may be used in this invention that is capable of reacting with an oxirane containing compound to form an unsaturated containing stabilizer. It is especially preferred that acrylic acid or methacrylic acid available from Rohm & Haas Co. is used.

Any acid functional chain transfer agent may be used in the practice of this invention that is capable of providing acid functionality to the copolymer. It is preferable that the acid functional chain transfer agent comprises a mercaptan and especially prefer that it comprises 3-mercaptopropionic acid available from Evans Chemetics.

Typically, a catalyst, preferably a tertiary amine catalyst is used in the practice of this invention to reduce the reaction time by accelerating the reaction of the acid and the oxirane. A tertiary amine catalyst is preferred because it doesn't have any labile hydrogens that could result in unwanted side reactions. It is especially preferred that dimethyl benzyl amine available from Kodak Chemicals is used.

Typically, a free radical inhibitor is utilized during the reaction of the acid and the oxirane containing α, β ethylenically unsaturated monomer to eliminate any further polymerization that might occur. It is believed that polymerization would result in loss of the unsaturated functionality. Preferably, a hydroquinone free radical inhibitor is used. It is especially preferred that Ionol TM Di-Tert Butyl Para-Cresol (Shell Chemicals) is used. Conventional nonpolar solvents provide the reaction medium for this invention. Examples include high flash varnish paint makers (VMP naphtha) (a distillation cut from petroleum distillates), mineral spirits, hexane and heptane. It is conventional in this art to add additives such as esters or ketones to these solvents to provide desired qualities such as the proper solubility characteristics.

The relative amounts of the above-described ingredients may be varied to achieve the right balance of properties such as molecular weight, polarity, and Tg, however, it is preferred that the following amounts are used in the practice of this invention.

(a) α, β ethylenically unsaturated monomers: about 86% to about 98%, preferably 97.6%;
(b) acid containing α, β ethylenically unsaturated monomers: about 1% to about 10%, preferably 3%;
(c) oxirane containing α, β ethylenically unsaturated monomers: about 1% to about 4%, preferably 1.5%;
(d) acid functional chain transfer agent: about 0.5% to about 4%, preferably 0.9%;
(e) free radical initiators: about 1% to about 10%, preferably about 2% to about 5%;
(f) tertiary amine catalyst: about 0.2% to about 1.0%, preferably 0.5%;
(g) inhibitor: about 50 parts per million (ppm) to about 400 ppm, preferably 200 ppm.
(h) acid functional initiator: about 1% to about 10%, preferably about 2% to about 5%.

Throughout this application a, b, c and d are weight percents of the final copolymer stabilizer, and e, f, g and h are weight percents based on the final copolymer stabilizer (e.g., if the final copolymer stabilizer weights 100 grams, the preferred amount of tertiary amine catalyst is 0.5 gram for a combined weight of 100.5 grams). The preferred amounts provide stabilizers and ultimately coatings with for example better appearance properties. The appropriate combinations of the above ingredients can be readily understood by reference to the following procedures which describe specific methods of making the copolymers of this invention, however typical combinations include (a,b,c,d,e,f,g). (a,c,e,f,g,h), (a,c,e,f,g,b), (a,c,d,e,f,g).

Any process may be used to form the copolymer stabilizer of this invention as long as it results in a copolymer stabilizer having the above described properties. Preferably a free radical polymerization process resulting in an aliphatic soluble copolymer that precedes an acid-oxirane reaction that results in addition of α, β ethylenic unsaturation to the stabilizer such as the two generic acid-oxirane reactions described empirically below

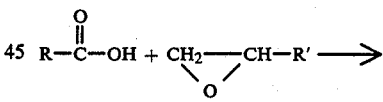

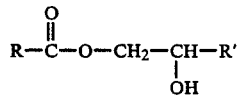

(a) R is an aliphatic soluble copolymer and R' is an α, β ethylenic unsaturation containing group
(b) R is an α, β ethylenic unsaturation containing group and R' is an aliphatic soluble copolymer.

However by varying the functionalities of, for example, the initiators or monomers different processes that fall within the above overall process scheme may be used such as one of the four especially preferred processes described below.

This first process comprises copolymerizing ethylenically unsaturated monomers some of which are acid functional resulting in an acid functional copolymer. This copolymer is then reacted with an oxirane containing α, β ethylenically unsaturated monomer to form the α, β ethylenically unsaturated acrylic copolymer of this invention.

Preferably the aliphatic rich solvents are brought to a reflux (the temperature at which the solution boils) at which time about 86% to about 98% ethylenically unsaturated monomers, about 1% to about 10% of which contain acid functionalities and about 1% to about 10% free radical initiator are added simultaneously over a period of about a half hour to three hours. The timewise addition of initiator and monomer is generally preferred for the processes described in this disclosure as it aids in achieving the desired molecular weight and helps control the reaction exotherm. This solution is held at reflux for about 20 minutes to about 40 minutes. More solvent and about 1% initiator is added over a period of about 15 to about 40 minutes, if necessary, to fully polymerize any residual monomer depending on the initiator's half-life. This solution is held at reflux until conversion is complete for an additional 1 to 5 hours. The solution is allowed to cool to a temperature that is below reflux but not above 100° C. It is preferable in the processes described in this disclosure not to exceed reflux as this can exclude oxygen which aids in the inhibition of further radical polymerization. It is also preferable not to exceed 100° C. in order to limit the degree of thermal initiation of radicals and any further polymerization. About 1% to about 4% oxirane containing $\alpha$, $\beta$ ethylenically unsaturated monomers about 200 ppm free radical inhibitor, preferably INOL, and about 0.2% to about 10% tertiary amine catalyst such as benzyl dimethyl amine is added to the solution. The solution is held at a temperature of about 95° C. to about 100° C. until an acid number of less than about 1 is achieved and then the solution is allowed to cool. An acid number refers to the milligrams of potassium hydroxide required to neutrailize the acid in one gram of sample. An acid number less than 1 demonstrates that the acid-oxirane reaction is complete enough to achieve a workable stabilizer.

A second process comprises copolymerizing ethylenically unsaturated monomers some of which are oxirane containing and reacting the thus formed copolymer with an acid containing, $\alpha$, $\beta$ ethylenically unsaturated monomer. Preferably this process comprises raising the reflux the nonpolar solvents and adding about 86% to about 98%, $\alpha$, $\beta$ ethylenically unsaturated monomers about 1% to 4% of which are oxirane containing and about 1% to about 10% free radical initiators to the solvent over a period of about a half hour to about 3 hours. This solution is held at reflux for an additional 2 to about 4 hours after which it is cooled to a temperature that is below reflux and not above 100° C. Then about 200 ppm free radical inhibitor, about 1% to about 4% acid containing $\alpha$, $\beta$ ethylenically unsaturated monomer, and about 0.2% to about 4.0% tertiary amine catalyst are added to the solution which is held below reflux until an acid number below 6 is reached at which time the solution is allowed to cool. If an excess of acid is utilized, it is only necessary to attain an acid number of less than 6 as the reaction is accelerated and the excess acid will not be neutralized.

The above processes result in copolymers having a statistical average in $\alpha$, $\beta$ ethylenically unsaturated functionality. However, in the preferred use of these stabilizers it is desired to have $\alpha$, $\beta$ ethylenically unsaturated monofunctionality as it aids in eliminating any dispersed phase gel in nonaqeuous dispersions of coating compositions. It is believed the multifunctional stabilizer containing dispersion does not coalesce as well and has a higher viscosity than monofunctional stabilizers. The processes described below essentially result in acrylic copolymers which contain $\alpha$, $\beta$ ethylenically unsaturated mono-functionality. However, it should be noted that a small percentage of polymer chains may contain multifunctional as well as fully saturated stabilizers. The $\alpha$, $\beta$ ethylenically unsaturated nono-functionality has been achieved by switching functionalities, so that the acid functionality is part of the copolymer formed which is subsequently reacted with an oxirane containing monomer, instead of the acid being on the monomer. This is achieved using acid functional initiators and acid functional chain transfer agents.

In this preferred process $\alpha$, $\beta$ ethylenically unsaturated monomers are copolymerized utilizing an acid functional initiator to form an acid containing copolymer which is subsequently reacted with an oxirane containing $\alpha$, $\beta$ ethylenically unsaturated monomer. Preferably, the solvent is charged to the reactor and brought to reflux. About 86% to about 98% ethylenically unsaturated monomers and about 1% to about 10% acid functional free radical initiators are added to the solvent over a period of about 1 to about 3 hours and held for an additional 3 hours at reflux. The solution is cooled to a temperature that is less than reflux but not about 100° C. About 200 ppm free radical inhibitor, about 0.2% to about 1% tertiary amine catalyst and about 1% to about 4% oxirane containing $\alpha$, $\beta$ ethylenically unsaturated monomer is added to the solution which is held at the above temperature until an acid number less than 1 is reached after which it is allowed to cool.

Although the above process results in an ethylenically unsaturated mono-functional acrylic copolymer, it utilizes acid functional inititators which are less preferred as they are of limited availability and are expensive. Thus, the process described below is the most preferred process that results in the desired stabilizer. In this process ethylenically unsaturated monomers are copolymerized with an acid functional chain transfer agent and subsequently the thus formed copolymer is reacted with an oxirane containing $\alpha$, $\beta$ ethylenically unsaturated monomer as described emperically below.

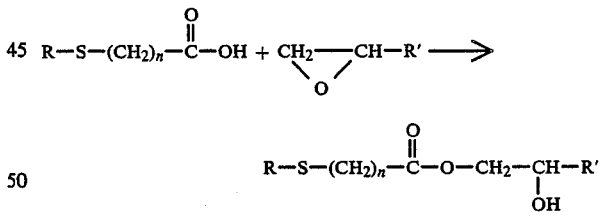

R is an aliphatic soluble copolymer;

R' is an $\alpha$, $\beta$ ethylenically unsaturation group.

It is especially preferred that the aliphatic solvents are brought to reflux and about 86% to about 98% ethylenically unsaturated monomers and about 1% to about 4% acid functional chain transfer agents are addd to the solvent over a period of about 30 minutes to about 3 hours after which the solution is held at reflux for an additional period of about 2 to about 5 hours. The solution is allowed to cool to a temperature that is below r flux but not above about 100° C. About 200 ppm free radical inhibitor, about 1% to about 4%, preferably about 1.5% of an oxirane containing $\alpha$, $\beta$ ethylenically unsaturated monomer and about 0.2% to about 10% tertiary amine catalyst, preferably dimethyl benzyl amine are added to the solution which is held at the above described temperature until an acid number less than 1 is reached. The solution is allowed to cool.

The above described α, β ethylenically unsaturated stabilizers are preferably copolymerized with the above described monomers whose Tg is above about 50° C. and polar monomers whose Tg is up to about 15° C. to form a (second) polar copolymer that has a Tg between about −10° C. and about 30° C.

Any proportion of monomers, stabilizer and initiator and chain transfer agent that provides the requisite properties described above may be used in the practice of this invention. It is preferred that the final copolymer comprises about 6% to about 25% preferably about 9% to about 15% stabilizer and about 75% to about 94% preferably about 85% to about 91% monomers. The monomers and stabilizer are copolymerized with about 1% to about 6% preferably about 1.3% initiator, and about 0% to about 2.7% preferably 0.13% chain transfer agent based on final copolymer weight (e.g., if the final copolymer weighs 100 grams, the preferred amount of initiator is 1.3 grams for a combined weight of 101.3 grams).

Conventional nonpolar solvents provide the reaction medium for this invention. Examples include high flash varnish paint makers (VMP naphtha) (a distillation cut from petroleum distillates), mineral spirits, hexane and heptane. It is conventional in this art to add additives such as esters or ketones to these solvents to provide desired qualities such as the proper solubility characteristics.

In addition, conventional formulation additives may be added to the nonaqueous dispersion to provide the qualities most desired, for which these coatings have their most popular applications. For example, acid catalysts for crosslinking agents, crosslinking agents such as melamine, plasticizers, and ultra violet absorbers may be used.

Preferably a free radical polymerization process is utilized in which the stabilizer is copolymerized with the coating monomers followed by formulation, application, and curing of the coating composition. It is especially preferred that the process described below is utilized as it results in a high solids coating composition having better sag resistance, gloss, DOI, etc. In this process the solvent is brought to reflux which throughout this disclosure refers to the boiling point of the mixture. In this invention, typical reflux temperatures are about 90° C. to 150° C. While the solvent is maintained at reflux temperature the monomers, stabilizers, initiators, and chain transfer agents are charged into the solvent over a period of about 30 minutes to 3 hours, preferably about 2 hours. The timewise addition of reactants is preferred as it results in a coating composition having better properties. It is believed that the controlled additions effect the molecular weight of the copolymer, however, it is difficult to measure the molecular weight as typically the copolymer cannot be filtered for gel permeation chromatography determination purposes. Additional solvent and about 1% initiator can then be added to fully polymerize any residual monomer, depending on the half-life of the intitiator used, and the solution polymerization held at reflux for an additional 1 to 5 hours preferably about 3 hours. Typically, as the polymerization occurs, the copolymer falls out of solution forming a nonaqueous dispersion.

These processes result in low Tg polar copolymers having a Tg between about −10° C. and about 30° C. particularly adapted for use as a clear coat automotive finish. These low Tg nonaqueous dispersions can result in coating compositions having better quality gloss and DOI in comparison to conventional high Tg nonaqueous dispersions. In conventional systems Tg relates to the carbon chain length of the ester portion of the monomer and thus to polarity and as Tg is reduced the copolymer becomes nonpolar and more soluble in the nonpolar continuous phase of the dispersion. Thus, typical low Tg copolymers raise the viscosity and lead to the same type of problems inherent in the solution polymers described in the background art section. A low Tg *polar* copolymer nonaqueous dispersion solves these problems relating to polarity and viscosity. Sinc these copolymers are formed from monomers whose Tg is about about 50° C. and monomers whose Tg is up to about 15° C. such that a low Tg copolymer is formed, the copolymer has superior appearance properties such as gloss, DOI, sag resistance, ultraviolet durability exposure, and humidity resistance.

In addition, these nonaqueous dispersions are made with α, β ethylenically unsaturated acrylic copolymer stabilizers. These stabilizers are preferably monofunctional in α, β ethylenic unsaturation and/or contain between about 5% to 30% hydroxyl functionality. The monofunctionality reduces any gel that can form in the nonaqueous dispersion. The hydroxyl functionality aids in reducing brittleness of the coating composition. The stabilizers have a molecular weight of about 2,000 to about 25,000 preferably about 15,000 to about 25,000 as these chain lengths provide nonaqueous dispersions having low viscosities and good stability. These stabilizers must be soluble in aliphatic solvents in order to polymerize the nonaqueous monomers into a stable nonaqueous dispersion. In addition since the stabilizer has a Tg of about −60° C. to about 0° C. it aids in achieving better quality appearance properties such as gloss, DOI, low sagging, ease of application, high % solids, ultraviolet durability exposure and humidity exposure for the final coating.

The as formed nonaqueous dispersion may be formulated into the final coating composition by conventional coating formulation processes. For example about 31% (based on final coating composition solids) melamine such as hexabutoxy methyl melamine available from American Cyanamid Co., Wayne, N.J. and about 58% coating copolymer are mixed. To this is added a premixed combination of about 1% acid catalyst such as p-toluene sulfonic acid and about 7% plasticizer such as trimethylolpropane-triethoxylate. In addition about 3% UV absorber such as Sanduvor 3206 ™ UV absorber (Sandoz Ltd.) helps protect against photodegradation of the copolymer.

The coating composition may be applied to the surface by a conventional process such as spraying with a siphon spray gun available from DeVilbiss Co. and is typically then cured on the surface over conventional times and temperatures such as about 85° C. to about 165° C. over about 20 to 40 minutes.

EXAMPLE I 711 grams (g) heptane was added to a reactor which was subsequently brought to reflux at 93° C. Then 1450 g to 2-ethyl hexyl acrylate, 655 g methyl methacrylate, 64.9 g glycidyl methacrylate and 79.4 g VAZO 67 initiator were simultaneously added to the refluxing solvent over a period of 125 minutes. The solution was heated at reflux (about 102° C.) for 3 hours after which it was cooled to 90° C. over a period of 3 minutes. Then 0.43 g Ionol inhibitor and 38.9 g acrylic acid were added over a period of 7 minutes. Then 4.3 g (4.7 milliliters) dimethyl benzyl amine were added to the solution whose temperature was 87° C. The solution temperature was raised to 100° C. and heated for approximately 8 hours attaining an acid number of 5.9 after which time it was allowed to cool. Yield 2901 g of a 75% solids solution.

211.4 grams(g) of the 75% solids stabilizer solution was charged along with 520 g amyl acetate, 733.2 g VMP naphtha, 88.4 g heptane, 71.0 g methyl methacrylate and 4.5 cubic centimeters t-amyl perbenzoate to a reactor vessel. This was bought to reflux (about 130° C.) and held for 30 minutes at which time 158.1 g methyl methacrylate, 591.8 g ethyl acrylate, 605.8 g hydroxyl ethyl acrylate, 69.7 g styrene, 15.1 g acrylic acid, 91.5 g of the above stabilizer solution, 1.9 g n-octyl mercaptan and 18.3 g t-amyl perbenzoate were added to the vessel over a period of 2 hours at which time the temperature was about 126° C. The suspension was held at reflux for an additional 2 hours 40 minutes and then allowed to cool. The yield was 3,149.5 grams of a 55.4% solids nonaqueous dispersion labeled F whose coating composition properties are tabulated in the table below.

EXAMPLE II 810 g of high flash VMP naphtha were added to a reactor vessel which was raised to reflux temperature (about 98° C.). 1550 g 2-ethyl hexyl acrylate, 764 g methyl methacrylate, 22 g 3-mercapto-propionic acid and 4.6 g VAZO 67 initiator were simultaneously added to the reactor vessel over a period of about 129 minutes and held for an additional 5 hours. The copolymer was subsequently cooled to about 98° C. Then 0.46 g Inonol inhibitor, 29.6 g glycidyl methacrylate and 11.6 g dimethyl benzyl amine were charged to the solution. It was heated for an additional 12.5 hours at about 98° C. resulting in an acid number at .89, after which time it was allowed to cool. Yield 3098.6 g of a 70% solids solution.

88.1 g of the above 70% solids stabilizer solution was changed along with 167.5 g amyl acetate, 248.4 g VMP naphtha, 47.3 g methyl methacrylate and 1.7 g t-amyl perbenzoate to a reactor vessel. The temperature was brought to reflux (about 138° C.) and heated for 30 minutes. Then 110.3 g methyl methacrylate, 158.6 g butyl acrylate, 232.6 g hydroxyl ethyl acrylate, 26.8 g styrene, 5.8 g acrylic acid, 0.7 g n-octyl mercaptan, 7.3 g t-amyl perbenzoate and 38.1 g of the above stabilizer solution were added to the reaction over a period of 2 hours as the heating continued at 138° C. The reaction was heated for an hour and then 4.0 g t-amyl perbenzoate and 10 g VMP naphtha was added over a period of 25 minutes. Heating was continued for an additional 2 hours at 183° C. at which time the reaction was allowed to cool. The yield was 1159.7 g of a 62% solids nonaqueous dispersion labeled I whose coating composition properties are tabulated in the Table below.

Table I below details the sag resistance, DOI and gloss for exemplary low Tg copolymer nonaqueous dispersions.

TABLE I
Composition and Properties of Nonaqueous Dispersion Coating Compositions STAB Stabilizer
EA Ethyl acrylate
HEA Hydroxyl ethylacrylate
AA Acrylic acid
STY Styrene
MMA Methyl methacrylate
BA Butyl acrylate
nOMC n-octylmercaptan

| RESIN | % STAB | % EA | % MMA | % HEA | % STY | % BA | % AA | % nOMC[1] | 20 DEG GLOSS[2] | DOI[3] | % NV[4] | SAG RESISTANCE |
|---|---|---|---|---|---|---|---|---|---|---|---|---|
| A | 13.0 | 39.9 | 30.3 | 8.3 | 3.8 | 0 | 0.8 | 0 | 93 | 100 | 60.9 | >2.5 mil |
| B | 13.0 | 33.5 | 30.8 | 17.3 | 4.0 | 0 | 0.9 | 0.10 | 89 | 90 | 61.2 | >2.5 mil |
| C | 13.1 | 49.9 | 14.7 | 17.4 | 4.0 | 0 | 0.9 | 0.10 | 75 | 80 | 61.0 | >2.5 mil |
| D | 13.5 | 25.6 | 30.1 | 25.9 | 4.0 | 0 | 0.9 | 0.10 | 70 | 80 | 60.9 | >2.5 mil |
| E | 13.5 | 25.6 | 30.1 | 25.9 | 4.0 | 0 | 0.9 | 0.10 | 65 | 80 | 62.3 | >2.5 mil |
| F | 13.1 | 34.0 | 13.2 | 34.8 | 4.0 | 0 | 0.9 | 0.11 | 70 | 60 | 58.5 | >2.5 mil |
| G | 13.1 | 41.6 | 27.4 | 13.0 | 4.0 | 0 | 0.9 | 0 | 80 | 60 | 54.1 | >2.5 mil |
| H | 13.1 | 54.5 | 10.1 | 17.4 | 4.0 | 0 | 0.9 | 0.10 | 82 | 70 | 61.3 | >2.5 mil |
| I | 13.1 | 0 | 23.6 | 34.8 | 4.0 | 23.7 | 0.9 | 0.10 | 72 | 40 | 56.7 | >2.5 mil |
| J | 20.0 | 45.9 | 13.7 | 16.0 | 3.7 | 0 | 0.8 | 0.10 | 83 | 70 | 54.2 | >2.5 mil |

[1]% n-octyl mercaptan based on total monomer weight
[2]20 degree gloss is a standard measure of the amount of light reflected when light is shined at 20 degrees from the perpendicular based on a scale from 0-100
[3]DOI is based on a scale from 0-100
[4]% nonvolatiles or % solids of the nonaqueous dispersion These coating compositions are especially useful for clear coat base coat compositions where this composition would form the clear coat. Although this disclosure has been directed to automotive finishes, it can be appreciated by those skilled in the art that this invention may be used for other coatings such as appliance coatings, etc.

These nonaqueous dispersions are high solid systems and yet they can be applied to a surface easily and do not suffer from sagging when the industry required 2.5 mil coatings are applied. In addition, their gloss and DOI are better than typical high Tg nonaqueous dispersions. It is believed that the inclusion of the low Tg monomers in the copolymer system provides the increase in gloss and DOI quality over the conventional high Tg nonaqeuous dispersion system because of greater coalescence of the copolymer.

Thus, a nonaqueous dispersion coating compos tion system has been discovered that achieves a balance of such properties as high % solids, ease of application, minimal sagging, gloss, DOI, ultraviolet durability exposure and humidity resistance. This invention provides a significant advance to the field of coatings in general and specifically to the clear coat automotive finishes.

It should be understood that the invention is not limited to the particular embodiments shown and described herein, but that various changes and modifications may be made without departing from the spirit and scope of this novel concept as defined by the following claims.

We claim:

1. A high solids, stable, nonaqueous dispersion in an organic medium, particularly adapted for use as a clear coat automotive finish comprising a copolymerization product of:
(a) monomers whose Tg is above about 50° C. selected from the group consisting of acrylic and methacrylic acid and esters thereof, styrene and substituted styrene
and at least two polar monomers whose Tg is up to about 15° C.; and
(b) α, β ethylenically unsaturated
stabilizer copolymers obtained by reacting an α, β ethylenically unsatured oxirane with an acid containing copolymer formed from α, β ethyleneically unsaturated monomers or by reacting an acid containing α, β ethylenically unsaturated monomer with an oxirane containing copolymer, formed from
α, β ethylenically unsaturated monomers, said stabilizer copolymer
(1) having a molecular weight of about 2,000 to about 25,000
(2) soluble in aliphatic solvents; and
(3) having a Tg of about -60° C. to about 0° C.;
such that the copolymerization product is a low Tg copolymer having a Tg between about −10° C. and about 30° C., the resulting dispersion having improved sag resistance when applied to a substrate and improved gloss and distinctness of image when cured to a film.

2. The nonaqueous dispersion as recited in claim 1 wherein the monomers whose Tg is above about 50° C. comprise acrylic acid, methacrylic acid, esters thereof, styrene, vinyl toluene, α methyl styrene, or mixtures thereof and the polar monomers whose Tg is up to about 15° C. comprise esters derived from acrylic acid.

3. The nonaqueous dispersion as recited in claim 1 wherein the monomers whose Tg is above about 50° C. comprise methyl methacrylate, styrene, acrylic acid, or mixtures thereof and the polar monomers whose Tg is up to about 15° C. comprise ethyl acrylate, hydroxyl ethyl acrylate or mixtures thereof.

4. The nonaqueous dispersion as recited in claim 3 wherein methyl methacrylate comprises about up to about 45%, styrene comprises about up to 10%, acrylic acid comprises about up to about 5%, ethyl acrylate comprises about 9% to about 60% and hydroxyl ethyl acrylate comprises about 10% to about 40% of the copolymer.

5. The nonaqueous dispersion as recited in claim 1 wherein the polar monomers whose Tg is up to about 15° C. comprises about 10% to about 40% of a hydroxyl functional monomer.

6. The polar monomer as recited in claim 1 wherein the polar monomer comprises about 10% to about 40% of hydroxyl ethyl acrylate.

7. The stabilizer copolymer as recited in claim 1 wherein the α, β ethylenically unsaturated monomers comprise monomers whose homopolymers are aliphatic soluble and monomers whose homopolymers are aliphatic insoluble.

8. The stabilizer copolymer as recited in claim 1 wherein the stabilizer copolymer is formed from aliphatic soluble acrylate or methacrylate monomers, or mixtures thereof and aliphatic insoluble acrylate or methacrylate monomers, or mixtures thereof.

9. The stabilizer copolymer as recited in claim 1 wherein the stabilizer copolymer is formed from aliphatic soluble ethyl hexyl acrylate and aliphatic insoluble methyl methacrylate.

10. The stabilizer copolymer as recited in claim 1 wherein the stabilizer copolymer is formed from at least 50% aliphatic soluble ethyl hexyl acrylate and up to about 50% aliphatic insoluble methyl methacrylate.

11. The stabilizer copolymer as recited in claim 1 wherein about 5% to about 30% of the α, β ethylenically unsaturated monomers comprise hydroxyl functional monomers.

12. The stabilizer copolymer as recited in claim 11 wherein the hydroxyl functional monomers comprises hydroxyl containing acrylate, hydroxyl containing methacrylate monomers, or mixtures thereof.

13. The stabilizer copolymer as recited in claim 11 wherein the hydroxyl functional monomers comprise hydroxyl ethyl methacrylate.

14. A method of forming a high solids copolymer nonaqueous dispersion in an organic medium particularly adapted for use as a clear coat automotive finish comprising:
(a) copolymerizing α, β- ethylenically unsaturated monomers with about 0.5% to about 4% acid functional chain transfer agents to form a copolymer;
(b) reacting said copolymer with about 1% to about 4% oxirane containing ethylenically unsaturated monomers to modify said copolymer; and
(c) copolymerizing said modified copolymer with monomers whose Tg is above about 50° C. selected from the group consisting of acrylic and methacrylic acid and esters thereof, styrene and substituted styrene and at least two polar monomers whose Tg is up to about 15° C. to form a second copolymer
such that the second copolymer is a low Tg copolymer having a Tg between about −10° C. and about 30° C., the resulting polymer dispersion having improved sag resistance when applied to a substrate and improved gloss and distinctness of image when cured to a film.

15. The method of claim 14 wherein the modified copolymer is an acrylic copolymer that is essentially monofunctional in α, β ethylenically unsaturation and is also soluble in aliphatic solvents.

16. The method as recited in claim 14 wherein the acid functional chain transfer agent comprises mercaptan and the oxirane containing α, β ethylenically unsaturated monomer comprises glycidyl acrylate or glycidyl methacrylate.

17. The method as recited in claim 14 wherein the acid functional chain transfer agent comprises 3-mercapto-propionic acid and the oxirane containing α, β ethylenically unsaturated monomer is glycidyl methacrylate.

18. A nonaqueous dispersion particularly adapted for use in clear coat automotive finishes, produced in accordance with the method of claim 14, 15, 16, or 17.

* * * * *